United States Patent Office 3,560,186
Patented Feb. 2, 1971

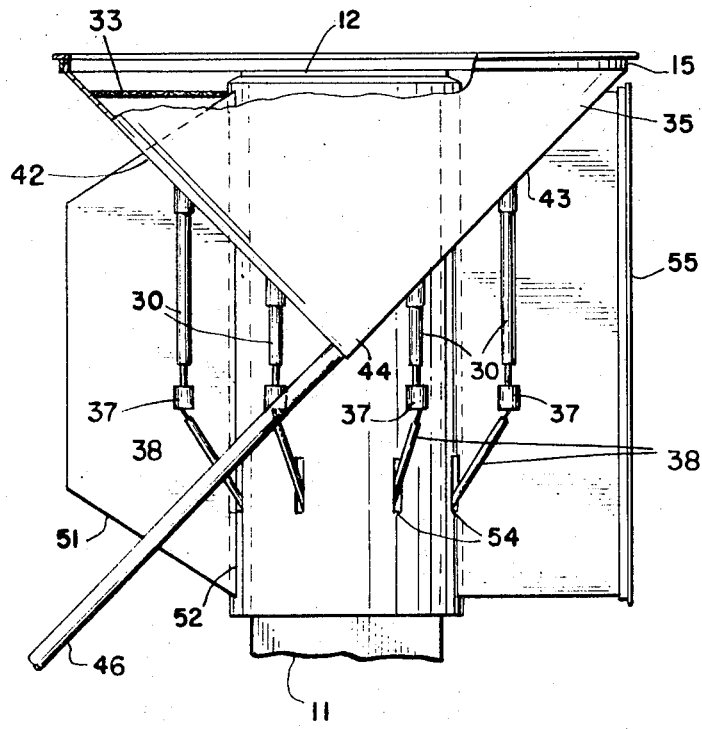
FIG. 4
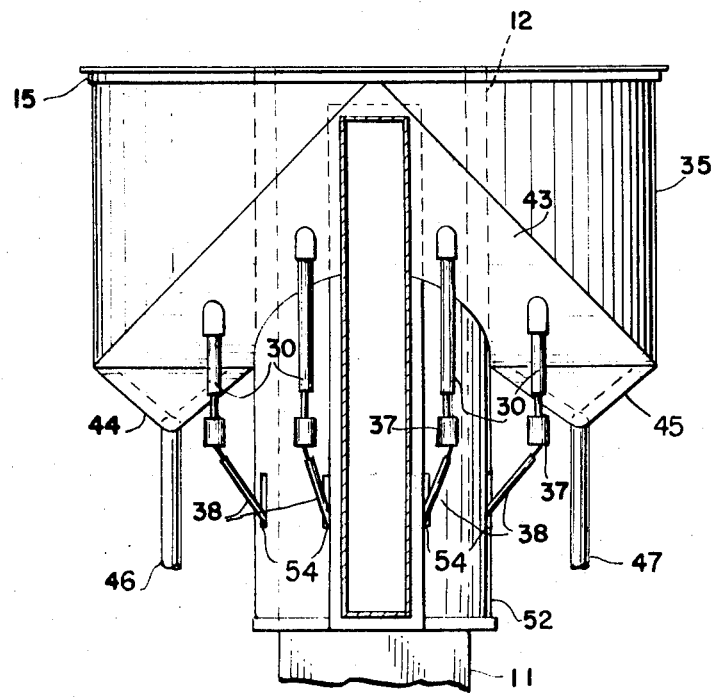
FIG. 5
FIG. 6

3,560,186
APPARATUS FOR PRODUCING GLASS BEADS WITH PREHEATING MEANS
Arthur G. Nylander, Passaic, N.J., assignor to Potters Bros., Inc., Carlstadt, N.J., a corporation of New York
Filed Mar. 11, 1968, Ser. No. 712,186
Int. Cl. C03b *19/10*
U.S. Cl. 65—142        12 Claims

ABSTRACT OF THE DISCLOSURE

An apparatus for producing glass beads from crushed glass particles in which the infeed conduits for the particles extend for an appreciable length within the vertical expansion chamber of the bead furnace, thus preheating the particles prior to the time they are introduced into the draft tube of the furnace.

BACKGROUND OF THE INVENTION

Glass beads and other spherical particles manufactured in accordance with the invention have numerous industrial and commercial applications. In many cases the beads are used to provide a reflecting surface, such as in lane marking for highways, for road and advertising signs, motion picture screens, etc. Other uses for the beads include applications in which their reflecting properties are of little moment, as in cases in which the beads are employed as fillers for plastic materials or for various electrical uses. The diameter of the beads may vary widely and illustratively ranges from about .125 inch down to about 25 microns.

In the manufacture of glass beads, it heretofore has been common practice to introduce irregularly shaped glass particles into a vertically disposed draft tube which is open at its upper end and is provided with a well-distributed gas flame adjacent its lower end. The particles are carried upwardly by the combustion gases into an expansion chamber or stack mounted above the draft tube. During their upward movement, the particles become soft and are shaped by surface tension into a substantially spherical configuration to form glass beads. For a more detailed discussion of representative bead manufacturing systems of this type, reference may be had, for example, to U.S. Pat. 2,619,776, granted Dec. 2, 1952, to Rudolf H. Potters and to U.S. Pat. 2,945,326, granted July 19, 1960, to Thomas K. Wood.

The prior apparatus and methods employed in the manufacture of spherical particles such as glass beads have exhibited certain disadvantages. As an illustration, the overall thermal efficiency of such prior systems was comparatively low, with the result that the manufacturing cost of the beads was excessive in many instances. In addition, in several systems of the type utilized heretofore difficulties were encountered as a result of the expansion and contraction of the infeed conduits for the crushed glass particles being introduced into the draft tube of the furnace. The systems previously employed also exhibited other disadvantages which further detracted from the efficient and economical manufacture of the beads on a large volume basis.

SUMMARY

One general object of this invention, therefore, is to provide a novel and economical apparatus for producing glass beads or other spherical particles.

More specifically, it is an object of this invention to provide such apparatus in which the available heat is utilized in a more efficient and less expensive manner than has been attainable heretofore.

Another object of this invention is to provide an apparatus for producing glass beads in which the infeed conduits for the crushed glass particles are mounted to compensate for the expansion and contraction of the conduits resulting from variations in temperature.

Still another object of the invention is to provide a new and improved apparatus for manufacturing glass beads that is economical and thoroughly reliable in operation.

In one illustrative embodiment of the invention, crushed glass particles are led through a plurality of infeed conduits to a vertically disposed draft tube. Supported above the draft tube is an elongated expansion chamber in the form of a vertical stack. A source of heat is positioned so as to direct heat into the draft tube, and the particles are propelled upwardly by the combustion gases through the tube and into the chamber. During their upward movement, the particles become soft and are shaped by surface tension into glass beads. The thus formed beads fall by gravity to the bottom of the chamber where they are collected for grading and packaging.

In accordance with one feature of the invention, the particles in the infeed conduits are preheated prior to their introduction into the draft tube. With this arrangement, the overall thermal efficiency of the system is substantially improved.

More particularly, in accordance with several advantageous embodiments of the invention the preheating of the particles is effected by directing their infeed conduits through the hot expansion chamber and then into the draft tube. Thus, the heat already available in the chamber is utilized to effectively preheat the particles, with the result that the preheating is accomplished in an extremely economical and straightforward manner.

In accordance with another feature of the invention, in certain good arrangements, the infeed conduits are rigidly supported adjacent the upper portion of the expansion chamber but are arranged with their lower ends hanging free and in spaced relationship with a cup-shaped member leading to the draft tube. The arrangement is such that the lower ends of the conduits are free to move relative to the cup members in response to variations in their length which result from temperature changes within the chamber.

BRIEF DESCRIPTION OF THE DRAWINGS

The present invention, as well as further objects and features thereof, will be understood more clearly and fully from the following description of a preferred embodiment, when read with reference to the accompanying drawings, in which:

FIG. 4 is an enlarged side elevational view of a portion of the apparatus of FIG. 1;

FIG. 5 is a front elevational view, with certain parts shown in section, of the portion of the apparatus illustrated in FIG. 4; and FIG. 6 is an enlarged fragmentary detail view, partly in section, of certain of the components shown in FIG. 4.

DESCRIPTION OF A PREFERRED EMBODIMENT

Figure 1:
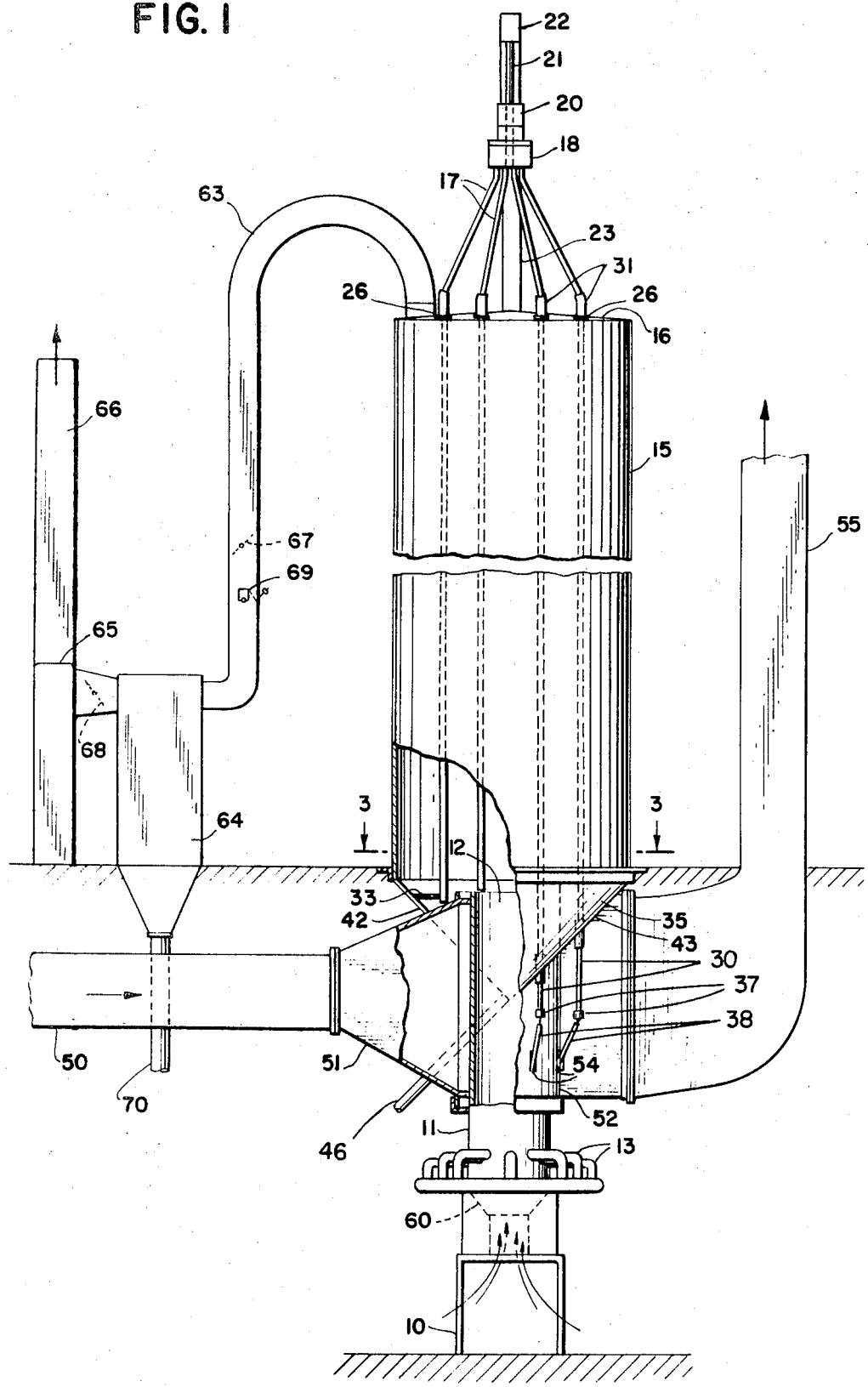
FIG. 1 is a diagrammatic view, partly broken away and in section, of apparatus for producing glass beads in accordance with one illustrative embodiment of the invention.

Referring to FIG. 1 of the drawings, there is shown a glass bead making furnace having a controlled suction draft which is similar in some respects to that disclosed in Wood U.S. Pat. No. 2,945,326 referred to heretofore. The furnace rests on a suitable support 10 and includes an upstanding generally cylindrical draft tube 11 which is open at its upper end 12. A series of gas burners 13 project into the tube 11 adjacent its lower end and are equally distributed around the periphery of the tube to provide a well-distributed flame therein.

Positioned above the open upper end 12 of the draft tube 11 is a vertically disposed expansion chamber or stack 15. The chamber 15 is of substantially enclosed, cylindrical configuration and is provided at its upper end with a cover 16. A series of pipes 17 are mounted on the cover 16, and these pipes extend angularly in an upward direction toward the axis of the chamber 15. The upper ends of the pipes 17 communicate with suitable apertures in the bottom of a cylindrical infeed casing 18. The upper surface of the casing 18 supports a housing 20 having an axially located pipe 21 therein which extends into the interior of the casing. A helical screw conveyor shown schematically at 22 is positioned above the housing 20. The conveyor 22 is supplied with crushed glass particles from an elevator 23 and is effective to continuously feed the particles through the pipe 21 and into the casing 18. For a more detailed discussion of the construction and mode of operation of the casing 18, the housing 20, the pipe 21 and associated parts, reference is made to the Arthur G. Nylander U.S. application Ser. No. 712,293 entitled Apparatus for Feeding Vitreous Material filed concurrently herewith.

Figure 2:
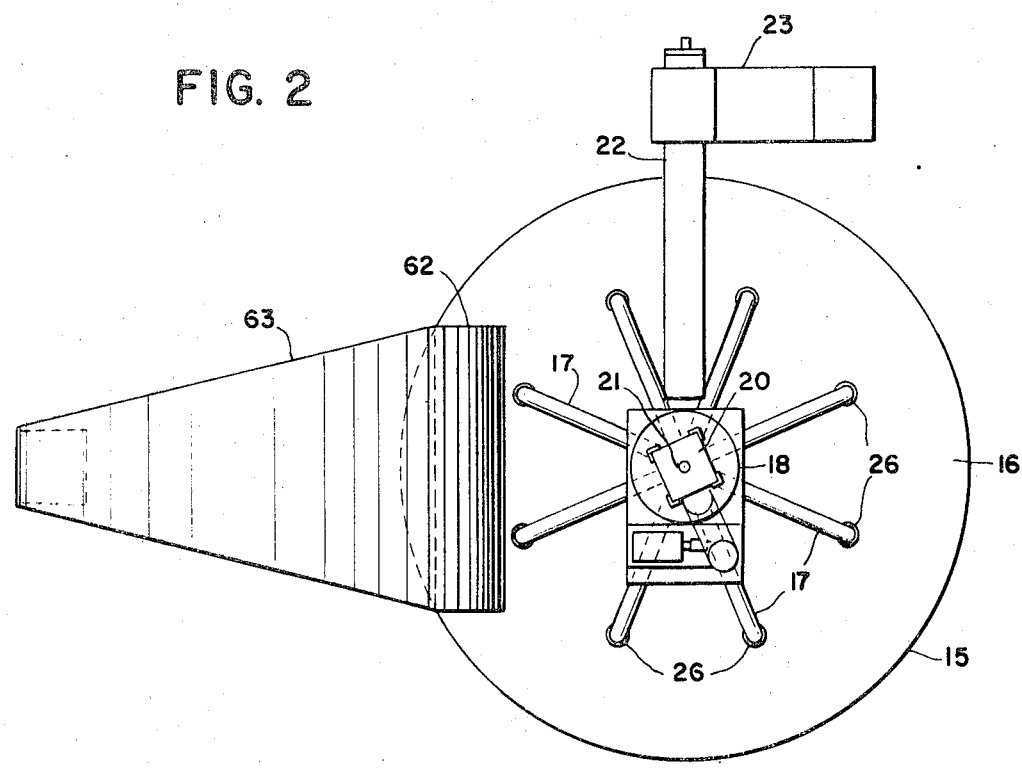
FIG. 2 is an enlarged top view of the apparatus shown in FIG. 1, with certain portions omitted for purposes of clarity.

As best shown in FIG. 2, the cover 16 is provided with eight equally spaced mounting members 26 which are radially oriented intermediate the center of the cover and its periphery. The mounting members 26 are effective to fixedly secure the upper ends of eight infeed conduits 30 (FIG. 1) to the cover 16. The conduits 30 protrude through suitable openings in the cover 16 and are connected to the corresponding angularly disposed pipes 17 by elbows 31. The arrangement is such that are is provided a continuous open path for the crushed glass particles from the conveyor 22, through the pipe 21 to the cylindrical casing 18, and then through the pipes 17 and the elbows 31 to the infeed conduits 30.

Figure 3:
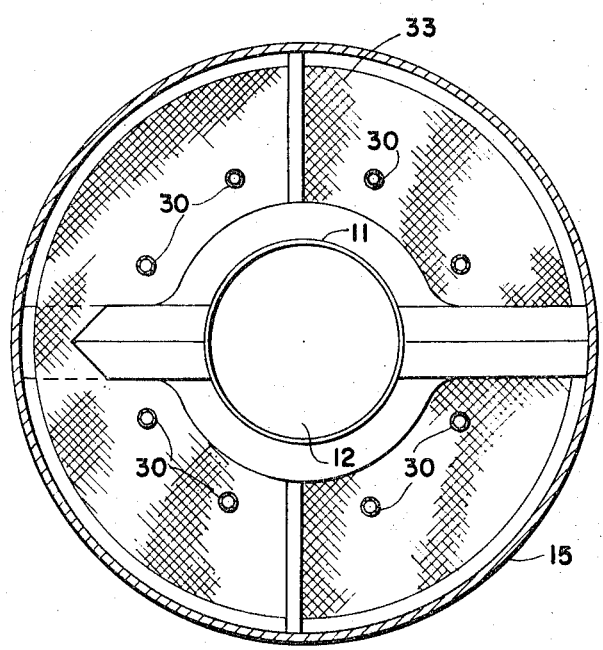
FIG. 3 is an enlarged fragmentary sectional view taken along the line 3—3 in FIG. 1.

The infeed conduits 30 are located within the expansion chamber 15 and extend downwardly for an appreciable distance from the cover 16 to the lower portion of the draft tube 11. A grating 33 (FIG. 3) is positioned across the open bottom of the chamber 15, and this grating serves to maintain the conduits 30 in spaced relationship with each other and with the inner wall of the chamber. Surrounding the upper portion of the tube 11 and affixed to the bottom of the chamber 15 is a collection chamber 35. The conduits 30 protrude from the chamber 35 and are externally disposed with respect to the tube 11.

As best shown in FIG. 6, the lower end of each of the infeed conduits 30 is spaced a short distance above the bottom portion of a cup-shaped member 37. Each of the members 37 communicates with an angularly disposed pipe 38 in supporting relationship therewith. The pipes 38 are adjustably held in position relative to the draft tube 11, as by turnbuckles 39, and the free ends of the pipes extend through corresponding openings 40 in the tube a short distance above the burners 13 (FIG. 1).

The collection chamber 35 is of generally cylindrical configuration but is provided with two flat faces 42 and 43 which intersect at the bottom of the chamber. The lower portion of the chamber 35 is shaped to provide discharge sections 44 and 45 (FIG. 5). The sections 44 and 45 resemble inverted pyramids and are respectively provided with outfeed conduits 46 and 47 leading to suitable collecting bins (not shown). With this arrangement, the outfeed conduits are maintained in open communication with the lowermost portion of the expansion chamber 15 to facilitate the removal of the beads therefrom.

The exterior surface of the draft tube 11 preferably is cooled, and to this end there is provided a cooling duct 50 (FIG. 1) which is supplied with a stream of air at substantially room temperature. The duct 50 is connected through an expanded portion 51 to a cylindrical plenum chamber 52. The chamber 52 surrounds the draft tube 11 in spaced relationship therewith, and the upper portion of the chamber is disposed within the collection chamber 35. A series of elongated openings 54 are provided in the chamber 52 to accommodate the angularly disposed infeed pipes 38. The chamber 52 exhausts into a vertical stack 55.

The draft within the tube 11 and the expansion chamber 15 is carefully regulated to control the velocity and temperature of the combustion gases therein. As more fully described in Wood U.S. Pat. 2,945,326 referred to above, a draft regulator 60 is positioned at the lower end of the tube 11 and is suitably mounted on the support 10. The cover 16 at the upper end of the chamber 15 includes a generally rectangular opening 62 (FIG. 2) leading to a conduit 63. This conduit extends downwardly through a separating device 64 to a suction fan 65 which exhausts upwardly through a stack 66 open to the atmosphere. Dampers 67 and 68 are disposed within the conduit 63 on opposite sides of the separator 64, and the conduit includes an adjustable opening 69 to provide an additional draft control. The fan 65 draws air into the draft tube 11 and the expansion chamber 15 through the draft regulator 60. The combustion gases are exhausted through the opening 62, the conduit 63, the separator 64, and the stack 66.

In operation, irregularly shaped crushed glass particles are continuously fed from the elevator 23 to the screw conveyor 22 and are transported by the conveyor to the pipe 21. The incoming particles then proceed to the casing 18, into the eight angularly disposed pipes 17 and downwardly through the infeed conduits 30. As the particles pass through the conduits 30, they are preheated by the column of combustion gases moving up the expansion chamber 15 to a predetermined elevated temperature which preferably lies within the range of about 500° F. to about 800° F. The radial distance of the conduits 30 from the axis of the chamber 15 and the draft tube 11 determines the range of temperatures over which the particles may be preheated, the greater radial distances producing the cooler preheating temperatures, and vice versa. The preheating temperature may be controlled within the desired range by varying the suction produced by the fan 65, by adjusting the dampers 67 and 68 and the size of the opening 69, etc., thus changing the draft in the chamber 15. The temperature should be on the high side of the preheating range for comparatively coarse particles, while lower temperatures may be employed for finer particles.

The preheated glass particles are fed by gravity from the infeed conduits 30 into the cup-shaped members 37 and then through the angularly disposed pipes 38 to the draft tube 11. The particles are discharged into the tube 11 a short distance above the burners 13 and are evenly distributed in the tube as a result of the equi-distant peripheral spacing of the pipes 38. Upon entering the tube 11, the particles are entrained with the upward flow of hot gases therein and are heated to a temperature sufficient to cause the softening of the particles and the shaping thereof by surface tension into spherical form to produce glass beads. Although the particular temperature to which the particles are heated may vary widely, depending upon such factors as the type of glass employed, the size of the particles, etc., the temperature of soda lime glass particles adjacent the upper portion of tube 11 illustratively is of the order of 2000° F.

The particles entrained in the combustion gases from the burners 13 are carried upwardly into the expansion chamber 15. The particles cool and solidify within the chamber 15 in the form of glass beads, and a substantial percentage of the larger beads drops through the relatively quiet lateral zones of the chamber to the collection chamber 35. These beads roll down the flat faces 42 and 43 of the chamber 35 into the two discharge sections 44 and 45, where they pass through the outfeed conduits 46 and 47 and are collected for grading and packaging.

The smaller solidified beads continue their upward movement with the combustion gases in the expansion chamber 15 and pass through the rectangular opening 62 and the conduit 63. The beads are separated from the entraining gases in the separating device 64 and are discharged through an outfeed conduit 70 into suitable containers (not shown).

The velocity and temperature of the combustion gases moving through the furnace may be controlled by adjusting the draft within the expansion chamber 15 and the draft tube 11. This adjustment may be accomplished by varying the speed of the suction fan 65, by changing the positions of the dampers 67 and 68 or by controlling the size of the opening 69. In general, the formation of comparatively large beads requires substantially greater draft in the draft tube 11 than the manufacture of relatively small beads. The draft is adjusted in accordance with the desired bead size and also to provide the requisite preheating temperature within the expansion chamber 15 in the manner described heretofore. As the temperature in the chamber 15 increases or decreases in accordance with variations in the desired draft, the infeed conduits 30 expand and contract accordingly. This expansion and contraction is absorbed by the free lower ends of the conduits 30 with the result that the structural integrity of the apparatus is maintained at all times.

Because of the preheating of the incoming glass particles in the conduits 30, the temperature of the particles need only be raised within the draft tube 11 from the preheating temperature to a temperature sufficient to soften the particles and enable surface tension to form glass beads. The source of heat for the preheating of the particles comprises the heat around the periphery of the chamber 15 which would otherwise be dissipated through the walls of the chamber and along the conduit 63 and the stack 66. As a result of the positioning of the preheating conduits within the chamber, the already available heat is employed to bring the incoming particles to their preheating temperature and thereby increase the overall thermal efficiency of the system.

Although the invention has been described and illustrated as having particular utility in the manufacture of glass beads, various other particulate materials may be processed thereby without departing from the spirit or scope of the appended claims. As an illustration, irregularly shaped particles of other vitreous materials or of thermoplastic resins, for example, may be shaped into spherical form through the use of the apparatus and method disclosed herein.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. Bead producing apparatus comprising, in combination, a vertically disposed draft tube, chamber means forming a bead furnace communicating with and extending above said draft tube, means for directing heat into said draft tube and said chamber means, supply means containing a multiplicity of irregularly shaped particles spheroidizable by rise of temperature, conduit means connected to said supply means for introducing said particles into said draft tube above the incoming heat, said conduit means passing through at least a poriton of the furnace formed by said chamber means to preheat said particles prior to their introduction into said draft tube, the particles in said draft tube being directed upwardly into said chamber means by the heat within said tube and being shaped by surface tension into spherical form, and means connected to said chamber means for collecting the thus produced spheres.

2. Bead producing apparatus comprising, in combination, a vertically disposed draft tube, means including a bead furnace defining an expansion chamber communicating with and extending above said draft tube, means for directing heat into said draft tube and said expansion chamber, supply means containing a multiplicity of irregularly shaped particles spheroidizable by rise of temperature, conduit means interconnecting said supply means and said draft tube for introducing said particles into said tube above the incoming heat, said conduit means passing inside said bead furnace to preheat said particles prior to their introduction into said draft tube, the particles in said draft tube being directed upwardly into said expansion chamber by the heat within said tube and being shaped by surface tension into spherical form, and collection means connected to said expansion chamber for receiving the thus produced spheres, said collection means including a plurality of outfeed conduits communicating with the lowermost portion of said expansion chamber.

3. Apparatus for producing glass beads from a supply of glass particles, said apparatus comprising, in combination, a vertically disposed draft tube, chamber means communicating with and extending above said draft tube, means for directing heat into said draft tube and said chamber means, conduit means including first and second conduits interconnecting said supply and said draft tube for introducing said particles into said tube immediately above the incoming heat, means cooperating with said conduit means for maintaining said first and second conduits in spaced-apart relationship with each other and for permitting relative movement therebetween, means for preheating said particles to a predetermined elevated temperature prior to their introduction into said draft tube, the preheated particles in said draft tube being directed upwardly into said chamber means by the heat within said tube and being shaped by surface tension into glass beads, and means connected to said chamber means for collecting said beads.

4. Apparatus of the character set forth in claim 3, further comprising control means for maintaining the temperature of said particles within the preheating means within the range of from about 500° F. to about 800° F.

5. Apparatus for producing glass beads from a supply of glass particles, said apparatus comprising, in combination, a vertically disposed draft tube, means including a bead furnace defining an upstanding expansion chamber communicating with and extending above said draft tube, means for directing heat into said draft tube and said expansion chamber, conduit means interconnecting said supply and said draft tube for introducing said particles into said tube immediately above the incoming heat, said conduit means passing inside said bead furnace to preheat said particles prior to their introduction into said draft tube, the particles in said draft tube being directed upwardly into said expansion chamber by the heat within said tube and being shaped by surface tension into glass beads, and means connected to said expansion chamber for collecting said beads.

6. Apparatus of the character set forth in claim 5, said conduit means including a plurality of vertically extending infeed conduits rigidly held in position adjacent their upper ends and a plurality of angularly extending infeed conduits communicating with said draft tube, and means for spacing the lower end of each of said vertically extending infeed conduits in sufficient proximity with a corresponding one of said angularly extending infeed conduits to feed glass particles thereto, said last-mentioned means permitting relative movement between the lower end of each vertically extending conduit and the corresponding angular conduit in resonse to expansion and contraction of the vertical conduit.

7. Apparatus for producing glass beads comprising, in combination, a vertically disposed draft tube, substantially enclosed chamber means forming a bead furnace communicating with and extending above said draft tube, means for directing heat into said draft tube and said chamber means, supply means containing a multiplicity of glass particles, conduit means interconnecting said supply means and said draft tube for introducing said particles into said tube immediately above the incoming heat, said conduit means passing inside said bead furnace to preheat said particles to an elevated temperature prior to their introduction into said draft tube, means including a suction fan for controlling the draft within said draft tube and said chamber means to thereby control the temperature to which said particles are preheated, the particles in said draft tube being directed upwardly into said chamber means by the heat within said tube and being shaped by surface tension into glass beads, and means connected to said chamber means for collecting said beads.

8. Apparatus of the character set forth in claim 7, said chamber means comprising a vertically extending expansion chamber of cylindrical configuration, and said conduit means comprising a plurality of infeed conduits vertically positioned within said expansion chamber, said infeed conduits being radially spaced a uniform distance from the axis of said chamber.

9. Apparatus for producing glass spheres comprising, in combination, a vertically disposed draft tube, means including a substantially enclosed expansion chamber communicating with and extending above said draft tube, means for directing heat into said draft tube and said expansion chamber, suction fan means for controlling the draft within said draft tube and said expansion chamber, supply means containing a multiplicity of glass particles supported above said expansion chamber, conduit means interconnecting said supply means and said draft tube for introducing said particles into said tube immediately above the incoming heat, said conduit means passing through said expansion chamber to preheat said particles to an elevated temperature prior to their introduction into said draft tube, said conduit means including a plurality of vertically extending conduits affixed adajacent their upper ends to said expansion chamber and a corresponding plurality of cup-shaped members, means attached to said draft tube for supporting the cup-shaped members in respective spaced relationship with the lower ends of said conduits to permit relative movement therebetween, said cup-shaped members being positioned to receive preheated glass particles from the corresponding conduits, said conduit means including means for feeding the preheated particles from said cup-shaped members into said draft tube, the preheated particles in said draft tube being directed upwardly into said expansion chamber by the heat within said tube to shape the particles by surface tension into glass spheres, and collection means connected to said expansion chamber for receiving the thus produced spheres, said collection means including a plurality of outfeed conduits communicating with the lowermost portion of said expansion chamber.

10. Apparatus for producing glass beads from a supply of glass particles, said apparatus comprising, in combination, a vertically disposed draft tube, chamber means forming a bead furnace communicating with and extending above said draft tube, said draft tube and said chamber means being disposed about a vertical axis, means for directing heat into said draft tube and said chamber means, conduit means interconnecting the supply of particles and said draft tube for introducing said particles into said tube immediately above the incoming heat, said conduit means including a plurality of infeed conduits vertically positioned inside said bead furnace to preheat said particles to a predetermined elevated temperature prior to their introduction into said draft tube, said conduit means further including a plurality of cup-shaped members in respective spaced relationship with the lower ends of the infeed conduits to form gaps therebetween and including means interconnecting the cup-shaped members with said draft tube, said infeed conduits being radially spaced a uniform distance from said vertical axis, the preheated particles in said draft tube being directed upwardly into said chamber means by the heat within said tube and being shaped by surface tension into glass beads, and means connected to said chamber means for collecting said beads.

11. Apparatus for producing glass beads from a supply of glass particles, said apparatus comprising, in combination, a vertically disposed draft tube, a bead furnace including an upstanding expansion chamber communicating with and extending above said draft tube, means for directing heat into said draft tube and said expansion chamber, conduit means interconnecting the supply of particles and said draft tube for introducing said particles into said tube immediately above the incoming heat, said conduit means passing inside said bead furnace to preheat said particles prior to their introduction into said draft tube, then passing from said bead furnace into the ambient atmosphere and then into said draft tube, the particles in said draft tube being directed upwardly into said expansion chamber by the heat within said tube and being shaped by surface tension into glass beads, and means connected to said expansion chamber for collecting said beads.

12. Apparatus of the character set forth in claim 3, in which the collecting means comprises a pair of spaced-apart inverted pyramids depending from the chamber means, and a pair of outfeed conduits respectively connected to the pyramids.

References Cited

UNITED STATES PATENTS

| | | | |
|---|---|---|---|
| 2,334,578 | 11/1943 | Potters | 65—21 |
| 2,619,776 | 12/1952 | Potters | 65—21 |
| 2,859,560 | 11/1958 | Wald | 65—21 |
| 2,945,326 | 7/1960 | Wood | 65—21 |
| 3,097,832 | 7/1963 | Murdock | 65—142 |
| 3,190,737 | 6/1965 | Schmidt | 65—142 |

S. LEON BASHORE, Primary Examiner

R. L. LINDSAY, JR., Assistant Examiner

U.S. Cl. X.R.

65—21; 264—15